United States Patent
Barber et al.

(10) Patent No.: US 9,600,639 B2
(45) Date of Patent: Mar. 21, 2017

(54) METHOD FOR AUTOMATING THE MANAGEMENT AND INTERPRETATION OF DIGITAL DOCUMENTS AND THEIR OWNERS RIGHTS METADATA FOR GENERATING DIGITAL RIGHTS MANAGEMENT PROTECTED CONTENTS

(71) Applicant: KONICA MINOLTA LABORATORY U.S.A., INC., San Mateo, CA (US)

(72) Inventors: Daniel Barber, San Francisco, CA (US); David Asao, Redwood City, CA (US); Rabindra Pathak, San Jose, CA (US); William Chang, Mountain View, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/828,426

(22) Filed: Aug. 17, 2015

(65) Prior Publication Data

US 2015/0356277 A1    Dec. 10, 2015

Related U.S. Application Data (63) Continuation of application No. 13/853,928, filed on Mar. 29, 2013, now abandoned.

(51) Int. Cl.
  *G06F 7/04*    (2006.01)
  *G06F 21/10*   (2013.01)
  *G06F 21/62*   (2013.01)

(52) U.S. Cl.
  CPC .......... *G06F 21/10* (2013.01); *G06F 21/6218* (2013.01); *G06F 2221/0746* (2013.01)

(58) Field of Classification Search
  CPC . G06F 21/10; G06F 21/6218; G06F 222/0746
  See application file for complete search history.

(56) References Cited

U.S. PATENT DOCUMENTS

| 8,909,925 B2 | 12/2014 | Baskaran |
| 2002/0091584 A1* | 7/2002 | Clark .................... G06F 21/10 705/26.1 |

(Continued)

OTHER PUBLICATIONS

Adobe Systems Incorporated, "Adobe LiveCycle ES3 Overview: Rights Management", http://help.adobe.com/en_US/livecycle/10.0/Overview/WS92d06802076abadb2c8525912ddcb9aad9-7ff8.html, 7 pages, printed from the internet on Apr. 15, 2014.

(Continued)

*Primary Examiner* — Techane Gergiso
(74) *Attorney, Agent, or Firm* — Chen Yoshimura LLP (57) ABSTRACT

A method for automating the management and interpretation of digital documents and their rights metadata to generate user access of a document protected by digital rights management (DRM), comprising the steps of a server obtaining a digital document and its associated rights metadata, the server interpreting the metadata to ascertain DRM useful information including identifications (IDs) of the document and its users and associated digital rights, and the server generating entries for a DRM database including policies associated with the document ID and users IDs based on the ascertained DRM useful information to enable DRM protection to the document.

18 Claims, 3 Drawing Sheets

(56) References Cited

U.S. PATENT DOCUMENTS

| | | | |
|---|---|---|---|
| 2005/0131885 A1* | 6/2005 | Komatsu | G06Q 30/02 |
| 2005/0257271 A1 | 11/2005 | Lafornara et al. | |
| 2006/0218643 A1 | 9/2006 | DeYoung | |
| 2008/0307533 A1* | 12/2008 | Hanai | G06F 21/10 726/30 |
| 2008/0320533 A1* | 12/2008 | Kitazato | G06F 21/10 725/98 |
| 2009/0281996 A1 | 11/2009 | Liu et al. | |
| 2009/0282432 A1* | 11/2009 | Hahnefeld | H04N 21/8355 725/31 |
| 2010/0250534 A1 | 9/2010 | Lee et al. | |
| 2012/0216289 A1 | 8/2012 | Kawaguchi | |
| 2013/0124856 A1* | 5/2013 | Agrawal | H04L 63/10 713/156 |
| 2013/0144981 A1* | 6/2013 | Koreeda | G06Q 10/00 709/219 |
| 2013/0166906 A1* | 6/2013 | Swaminathan | H04L 65/4084 713/155 |
| 2013/0218829 A1* | 8/2013 | Martinez | G06F 21/6272 707/608 |
| 2013/0347056 A1* | 12/2013 | Kuhlman | H04L 29/06 726/1 |
| 2014/0033265 A1 | 1/2014 | Leeds et al. | |

OTHER PUBLICATIONS

Adobe Systems Incorporated, "Programmatically applying policies", http://help.adobe.com/en_US/livecycle/10.0/Overview/WSb96e41f8a4ca47a9-4882aeb5131190eddba-8000.html, 1 page, printed from the internet on Apr. 9, 2014.

Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.

* cited by examiner

METHOD FOR AUTOMATING THE MANAGEMENT AND INTERPRETATION OF DIGITAL DOCUMENTS AND THEIR OWNERS RIGHTS METADATA FOR GENERATING DIGITAL RIGHTS MANAGEMENT PROTECTED CONTENTS

BACKGROUND OF THE INVENTION

Field of the Invention

This invention relates to a method for digital rights management (DRM) of electronic digital documents, and in particular, it relates to a method for automating the management and interpretation of digital documents and their owners rights metadata for generating DRM protected contents.

Description of Related Art

DRM are increasingly applied and used to control the access and prevent unauthorized use of documents generated, distributed and accessed electronically in digital file formats such as the Portable Document Format (PDF). For example, when a user purchases a DRM-protected document from a rights management system (RMS), a policy is added to the document which specifies the rights purchased by or granted to the user, such as the rights to view, copy and/or print the document. The RMS will maintain a database of the document identification (ID) and the associated policy which contains the ID of the user and the rights purchased by or granted to the user. After the user downloads the documents as, e.g., a PDF file, the user may access and view the document on the user's computer through a reader program/application such as, for example, the Adobe® Reader application.

In order to manage user access to DRM-protected documents, the RMS will typically install and run on its server a DRM program/application, for example Adobe®'s Life-Cycle® application. When a user attempts to access and view a PDF document on the user's computer, the Adobe® Reader will communicate with the Adobe® LifeCycle® application on the RMS server and transmits the document ID and the user ID to the Adobe® LifeCycle®. The Adobe® LifeCycle® will check through the RMS database and see what policy is associated with the document and under such policy what rights have been purchased by or granted to the user. If the user has the necessary rights, then the user access to the PDF document will be granted. Otherwise the user access will be denied or revoked.

The description herein of the structures, functions, interfaces and other relevant features, such as digital rights policies, application programming interface (API) for rights management and policies, etc., of existing DRM applications, such as the Adobe® LifeCycle®, may at times incorporates, references or otherwise uses certain information, documents and materials from readily available and accessible public information, e.g., "Rights Management" (URL http://help.adobe.com/en_US/livecycle/10.0/Overview/WS92d06802c76abadb2c8525912ddcb9aad9-7ff8.html), "Programmatically applying policies" (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc.

In addition, there are existing service centers for rights owners of digital contents that maintain databases of metadata associated with digital documents, containing rights information related to the rights owners' wishes on how the respective digital documents are used and distributed, etc., which are closely related to and useful for establishing and maintaining the policies associated with such documents.

There is a need to provide a method for automating the management and interpretation of digital documents and their owners rights metadata for generating DRM protected contents.

SUMMARY

Embodiments of the present invention provide a method for automating the management and interpretation of digital documents and their owners rights metadata for generating DRM protected contents.

Additional features and advantages of the invention will be set forth in the descriptions that follow and in part will be apparent from the description, or may be learned by practice of the invention.

The objectives and other advantages of the invention will be realized and attained by the structure particularly pointed out in the written description and claims thereof as well as the appended drawings.

To achieve these and/or other objects, as embodied and broadly described, one of the exemplary embodiments of the present invention provides a method for automating the management and interpretation of digital documents and their rights metadata to generate user access of a document protected by digital rights management (DRM), comprising the steps of a server obtaining a digital document and its associated rights metadata, the server interpreting the metadata to ascertain DRM useful information including identifications (IDs) of the document and its users and associated digital rights, and the server generating entries for a DRM database including policies associated with the document ID and users IDs based on the ascertained DRM useful information to enable DRM protection to the document.

In a further aspect, another one of the exemplary embodiments of the present invention provides a computer software program product that causes a data processing apparatus to perform the above described methods. The computer program product includes a computer usable non-transitory medium (e.g. memory or storage device) having a computer readable program code embedded therein for controlling a data processing apparatus, the computer readable program code configured to cause the data processing apparatus to execute the above described processes.

It is to be understood that both the foregoing general description and the following detailed description are exemplary and explanatory and are intended to provide further explanation of the invention as claimed.

DETAILED DESCRIPTION OF PREFERRED EMBODIMENTS

In one aspect as summarized above, an exemplary embodiment of the present invention provides method for automating the management and interpretation of digital documents and their owners rights metadata for generating DRM-protected documents and their respectively associated rights management policies.

Figure 1:
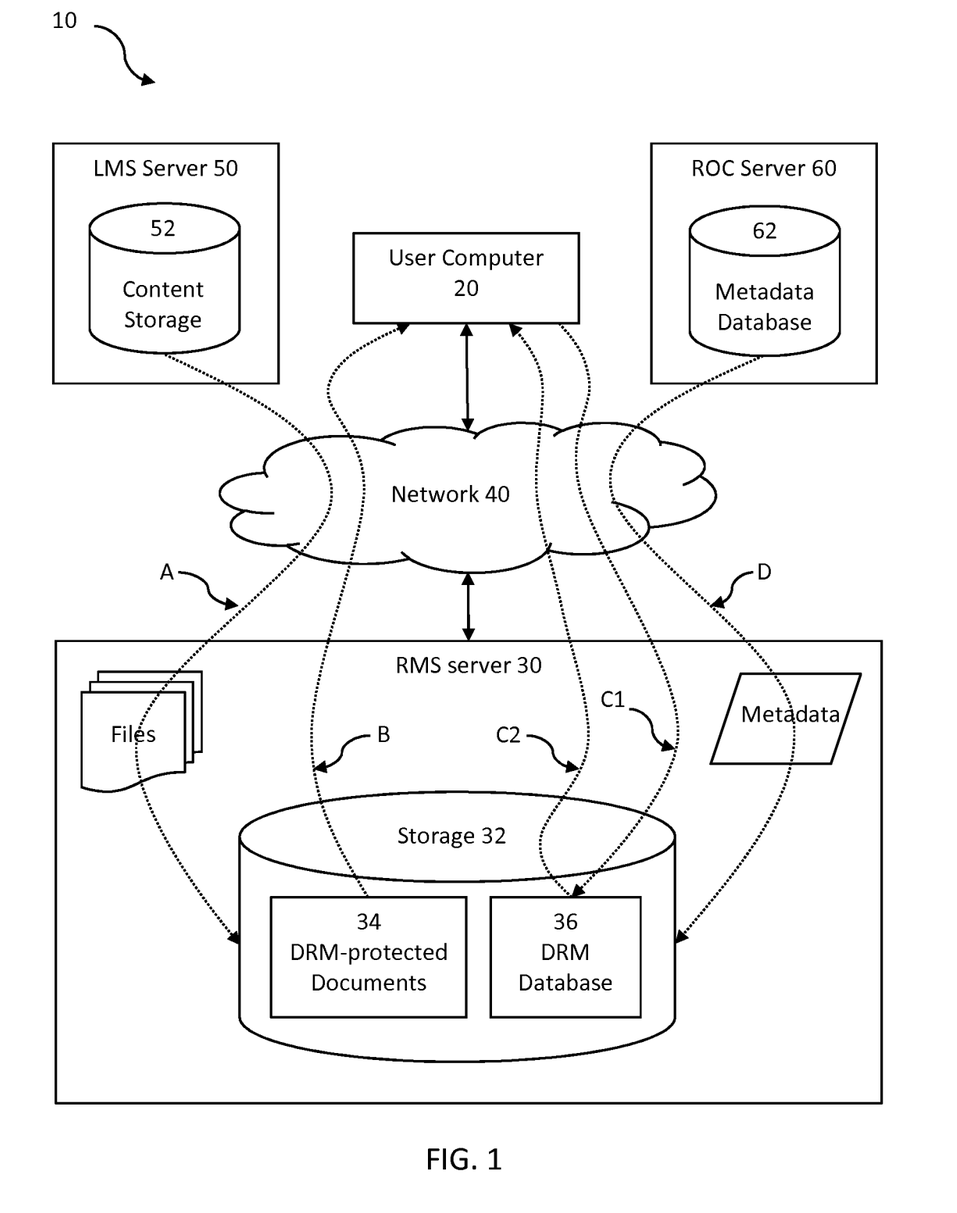
FIG. 1 is a schematic block diagram illustrating an exemplary online environment according to one of the embodiments of the present invention.

Referring to FIG. 1, there is shown a schematic block diagram illustrating an exemplary arrangement 10 in which various embodiments of the present invention may be implemented. The exemplary environment 10 includes a customer or user computer or terminal 20 which may be remotely connected to a rights management system (RMS) server 30 via a network 40, The network 40 may include a computer network such as the Internet or other communication links.

Also connected to the network 40 are a learning management system (LMS) server 50 and a rights owners' center (ROC) server 60. The RMS server 30, the LMS server 50 and/or the ROC server 60 may be a content provider server as well as a DRM server.

When computer network such as the Internet is utilized, a customer or user may use the user computer or terminal 20, or similar suitable devices such as a laptop computer, a tablet computer, an e-reader, or a smart phone, etc., to access the network 40 and interact with the RMS server 30 and/or the LMS server 50, etc.

An administrator or operator may operate the RMS server 30 to access the network 40 and interact with the customer or user through the user computer or terminal 20, and also interact with the LMS server 50 and/or the ROC server 60. Likewise, an administrator or operator may operate the LMS server 50 to access the network 40 and interact with the customer or user through the user computer or terminal 20, and also interact with the RMS server 30 and/or the ROC server 60. In addition, an administrator or operator may operate the ROC server 60 to access the network 40 and interact with the customer or user through the user computer or terminal 20, and also interact with the RMS server 30 and/or the LMS server 50.

The RMS server 30 may be operated by, for example, a DRM center or service provider, an educational institution, a print shop, etc., and generally provides online DRM services to users who wish to access DRM-protected documents such as articles, books, booklets, publications and other materials in digital formats. The RMS server 30 may provide an integrated online service platform such as an online authentication and authorization center that processes users' requests to access DRM-protected documents. The RMS server 30 has a storage 32 which may be an internal or external storage device for storing a DRM-protected documents depository 34 and a DRM database 36.

The digital files of electronic documents may be provided by the LMS server 50, as indicated by the dotted arrow A in FIG. 1. When an electronic document is purchased by a customer or user in a digital file, the RMS server 30 may enable appropriate DRM protection to the document such that only the user who has purchased the document may have rights to access and view the document. A policy containing the user ID and the user's rights is added to the document which also has a globally unique ID (GUID) to enable DRM-protection to the document. The DRM-protected documents are stored in file depository 34 and their associated policies may be found in DRM database 36. A customer or user who has purchased or otherwise granted rights to a DRM-protected document may download a digital copy of the DRM-protected document from the DRM-protected document depository 34 to the customer or user's computer 20, as indicated by the dotted arrow B in FIG. 1. When the RMS server 30 subsequently receives a customer or user request (which contains the GUID of the document and the ID of the customer or user) for accessing a DRM-protected document, as indicated by the dotted arrow C1 in FIG. 1, the RMS server 30 will search through the DRM database 36 by looking up the document GUID or the user ID, and check what policy is associated with the document and/or user, in order to determine whether the requesting customer or user has the appropriate rights to access the document. Based on the result of the determination, the RMS responds to the customer or user's request by either granting or denying the requested access to the document, as indicated by the dotted arrow C2 in FIG. 1.

The LMS server 50 may be operated by, for example, an educational institution, a library, a bookstore, or any digital content providers, etc., and generally provides online electronic documents, books, booklets, publications and other materials in digital files. The LMS server 50 and the RMS 30 server may be the same server (operated by a same entity). The LMS server 50 may provide an integrated online service platform such as an online course or web-store that allows customers or users to search, access, upload or download, and purchase electronic documents stored as digital files in its internal or the external storage 52.

The ROC server 60 may be operated by a rights owners' center or service provider, and generally provides a database or information source of documents owners' rights (such as copyrights). Such information may be provided in the form of metadata associated with digital documents. For example, the metadata associated with a course book may include: title, author, publisher, International Standard Book Number (ISBN), copyrights royalty, price, etc. In a sense, the metadata contains the course book owner's wishes on how the course book may be used and/or distributed. The ROC server 60 has an internal or external storage for storing a metadata database 62.

The rights information contained in the metadata may be very useful for establishing and/or maintaining the policies respectively associated with the DRM-protected documents. The ROC server 60 may provide the metadata to the RMS server 30, or the RMS server 30 may retrieve such metadata from the ROC server 60, as indicated by the dotted arrow D in FIG. 1. The RMS server 30 can use the metadata to generate and/or update the policies associated with the DRM-protected documents. As will be described in more detail below, some embodiments of the present invention provide a method for automatically interpret of digital documents and their owners rights metadata to generate and/or update the policies respectively associated with DRM-protected documents.

The computers, terminals and servers 20, 30, 50 and 60 used by the customers or users, and/or the administrators or operators of the RMS, LMS and/ROC services, may be computers, server computers, or computer or server systems, such as webservers, where the computer software program (s) and/or application(s) implementing the various processes of the exemplary embodiments of the present invention may be installed and executed. Typically these computers and servers provide a user interface (UI) or graphic user interface (GUI) to allow users or operators to interact with the computer software programs and applications to perform various steps of the process. In this Application, unless otherwise specified, the term "server" generally refers to any computer, server, server computer, server instance, computer or server system, data processor, controller, data processing unit or apparatus, or any suitable system, apparatus or device, and any computer software program or application that are installed or executed on such system, apparatus or device, that may be used to implement the methods or carry out the processes provided by the embodiments of the present invention.

A user or operator typically accesses the computers and server by using computer programs or applications on the users' own computer or on a server that the user can access through a user computer or terminal. In this Application, unless otherwise specified, the term "user" generally refers to anyone who uses the method or related apparatus provided by the embodiments of the present invention. In addition, in this Application, unless otherwise specified, the terms "user" and the server used by the user may be used interchangeably respectively to refer to such person or entity who uses a server and/or a server that is used by such person or entity to carry out the steps of the process according to the various embodiments of the present invention.

The physical locations or the commercial relationship among the various parts of the environment shown in FIG. 1 are not important. For example, the RMS server 30 may be located in a print shop or a commercial establishment, and the LMS server 50 may be all located in an educational institution or an organization. Further, the ROC server 60 and the LMS server 50 may be integrated as one server, or the ROC metadata database 62 may be maintained by or associated with the LMS server 50.

In another aspect as mentioned earlier, the exemplary embodiment of the present invention is embodied a computer program product that causes a data processing apparatus to perform the exemplary embodiments of the methods of the present invention. The computer program product includes a computer usable non-transitory medium (e.g. memory or storage device) having a computer readable program code embedded therein for controlling a data processing apparatus, where the computer readable program code is configured to cause the data processing apparatus to execute the process of the present invention as shown in FIG. 2.

Figure 2:
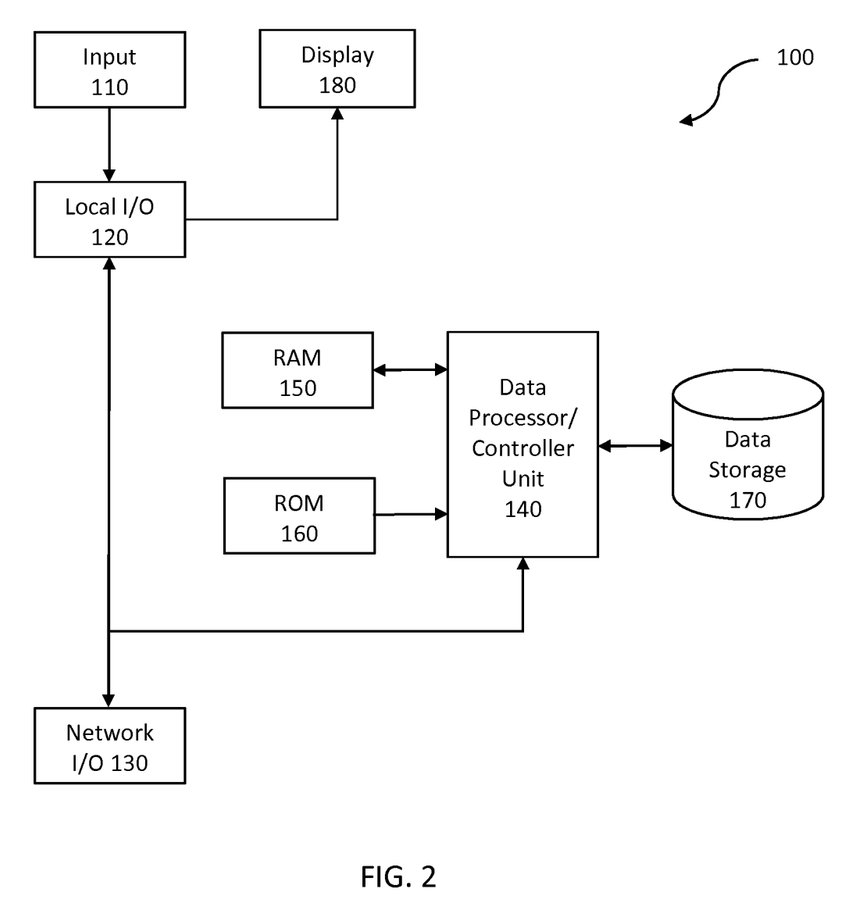
FIG. 2 is a schematic block diagram illustrating an exemplary data processing apparatus such as a computer or server having a data processing unit according to one of the embodiments of the present invention.

Referring to FIG. 2, there is shown a schematic block diagram illustrating an exemplary server 100, whereupon various embodiments of the present invention may be implemented. The server 100 typically includes a user input device 110 including, for example, a keyboard and a mouse. The input device 110 may be connected to the server 100 through a local input/output (I/O) port 120 to enable an operator and/or user to interact with the server 110. The local I/O 120 is also provided for local connections via direct links to other electronic devices such as a file storage, a monitor and/or a printer. The server 100 typically also has a network I/O port 130 for connection to a computer network such as the Internet, so that the server 100 may remotely communicate with the other servers connected to the computer network.

The server 100 typically has a data processor/controller unit 140 such as a central processor unit (CPU) that controls the functions and operations of the server 100. The data processor/controller unit 140 is connected to various memory devices such as a random access memory (RAM) device 150, a read only memory (ROM) device 160, and a storage device 170 such as a hard disc drive or solid state memory. The storage device 170 may be an internal memory device or an external memory device such as a file storage device.

The computer software program codes and instructions for implementing the various embodiments of the present invention may be installed or saved on one or more of these memory devices such as the ROM 160 or storage device 170. When executed, certain computer program codes and/or instructions may be read out from the ROM 160 or storage device 170 and temporarily stored in the RAM 150 for execution by the data processor/controller unit 140, which executes these computer programs codes and/or instructions to perform the functions and carry out the operations to implement the process steps of the various embodiments of the present invention.

The server 100 typically also includes a display device 180 such as a video monitor or display screen which may be connected to the local I/O 120. The input device 110 and the display device 180 together provide a user interface which allows a user to interact with the server 100 to perform the steps of the process according to the various embodiments of the present invention. The input device 110 and the display device 180 may be integrated into one unit, such as a touch screen display unit, to provide a more easy and convenient UI for user interaction with the server 100.

It is understood that the server 100 may be any suitable computer or computer system. Preferably for use, for example, as the RMS server 30, the LMS server 50 and the ROC server 60, the server 100 is a commercial server. However, for use by a customer or a member of the general public, the server 100 may be a desktop computer, a laptop computer, a notebook computer, a netbook computer, a tablet computer, a hand-held portable computer or electronic device, a smart phone, or any suitable data processing apparatus that has suitable data processing capabilities.

Figure 3:
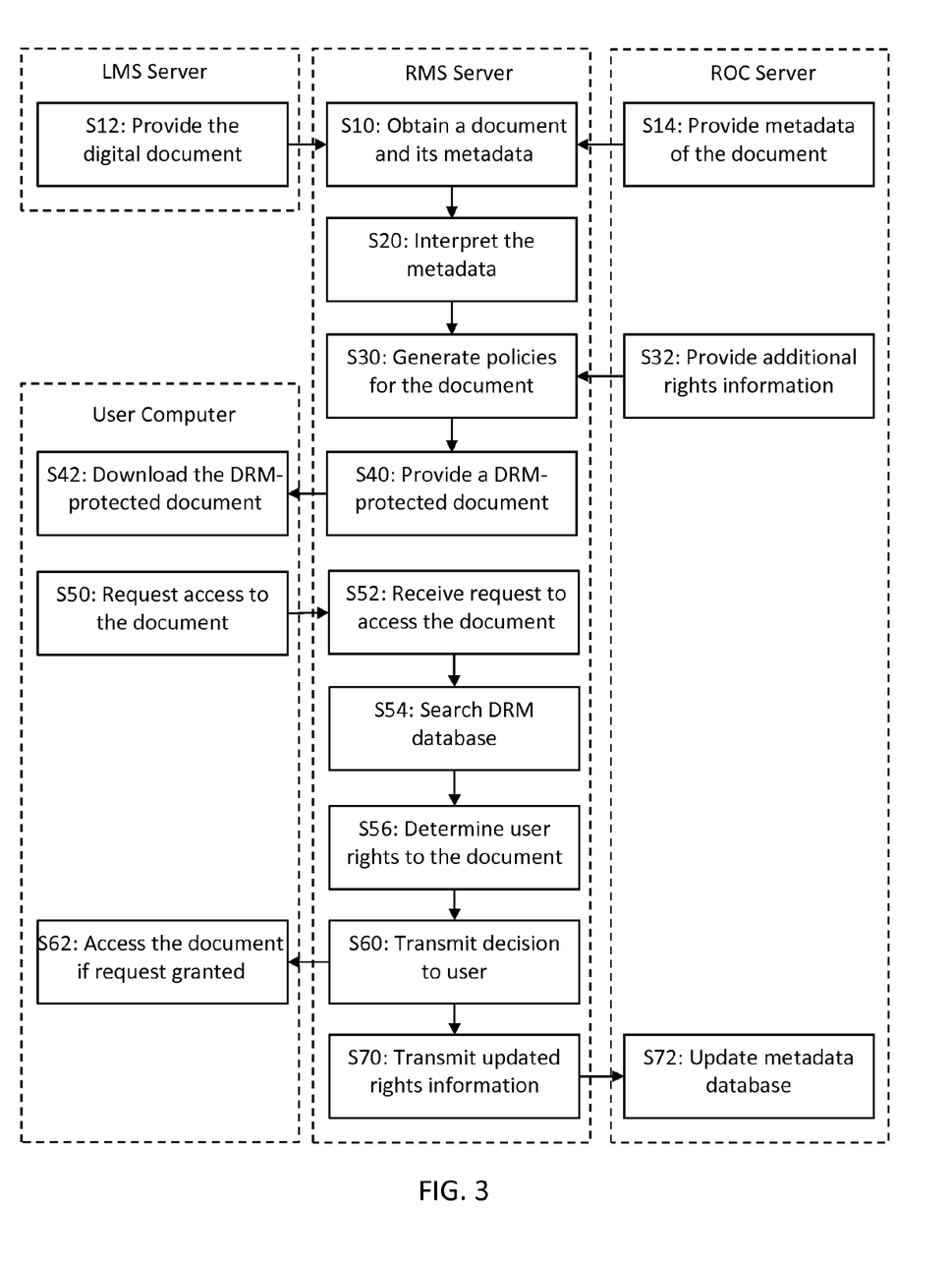
FIG. 3 is a flow chart diagram illustrating an exemplary process according to one of the embodiments of the present invention.

Referring to FIG. 3 (and in conjunction with FIG. 1), there is shown a flow chart diagram illustrating an exemplary process in accordance with to one of the embodiments of the present invention for automating the management and interpretation of digital documents and their owners rights metadata for generating DRM-protected documents and their associated rights management policies.

The process begins at step S10, wherein the RMS server 30 obtains a digital document from the LMS server 50 (as indicated by the dotted arrow A in FIG. 1), as well as metadata associated with such document from the ROC server 60 (as indicated by the dotted arrow D in FIG. 1). This step may include a sub-step S12 where the digital document is transmitted from the LMS server 50 to the RMS server 30, either by the LMS server 50 providing the document to the RMS server 30 or by the RMS server 30 retrieving from the LMS server 50, and also a sub-step S14 where metadata of the digital document is transmitted from the ROC server 60 to the RMS server 30, either by the ROC server 60 providing the metadata of the document to the RMS server 30 or by the RMS server 30 retrieving from the ROC server 60. It is understood that the digital document and its metadata may be obtained or retrieved from the same server, such as the LMS server 50 or the ROC server 60, alone.

The digital document may be downloaded to the RMS server 30 from the file storage 52 of the LMS server, or uploaded by a user from the user computer 20 to the RMS server 30, or otherwise retrieved from a third party server (not shown), e.g., by following a Universal Resource Locater (URL) provided by the user or the RMS service. For example, if a digital course book pack or booklet is to be generated from the compilation of several digital files, these digital files may be gathered from various sources.

The RMS server needs to search in and retrieve the metadata associated with the digital document from the metadata database 62 of the ROC server 60. Sometimes the digital document comes with certain metadata (e.g., title, author, publisher, ISBN, etc.) which have already been associated with the digital document, but oftentimes additional metadata (e.g., copyrights owners, royalty and pricing information) may still need to be obtained from the ROC server 60.

Once the RMS server 30 gathered the needed digital document and its associated metadata, at step S20 the metadata will be interpreted for generating DRM policies for the digital document at step S30. The interpretation of metadata is automated to yield a specific format of rights documents that the rights management system can then use to create specific rights for the document to be DRM-protected with the original intent of the author/creator/submitter of the document, some of them exemplified in the following descriptions. For example, each policy may include a document GUID which may be generated from relevant metadata (such as title, author, publisher, ISBN, etc.) of the document. As one of the examples of the metadata interpretation, the metadata is used to provide information needed for the policy database which often requires specific data format, so part of the interpretation step S20 is to convert the information obtained from the metadata into data items that can be saved and used for the policy database. Another example of the metadata interpretation is that if the metadata indicates that a copyrights royalty is paid for printing (e.g., reproducing in hardcopies) a document, then it may be interpreted as the print right of the document is granted by its owner, so the policies associated with the document may include right to print the document.

In addition, the interpretation process may add further enhancement or limitation to the DRM application based on certain particular rights contained in the metadata. For example, the metadata may contain calendar or scheduler based right, such as a document of a course material may be viewed on every Tuesday (because, e.g., the course is offered on every Tuesday). However, the DRM application or its policy formats may not readily have the ability to define or limit the right in that manner, as the DRM application may only allow an input of a start time and an end time once (between which the right may be effective). In such situations the interpretation process according to the embodiments of the present invention may offer a solution by adding/removing the view right to the course document repeatedly on a weekly basis. For example, the view right to the document may be added at midnight Monday night, and revoked at midnight Tuesday night, and then added back at midnight next Monday night, and revoked again at midnight next Tuesday night, and so on. In more detail, during the interpretation, the RMS server 30 generates an adding/removing schedule of view right based on the calendar/scheduled based right, and stores the generated schedule as a file or an entry of a file in a storage area, which can be an area separately managed from the DRM database 36. In one exemplary embodiment, the RMS server 30 may monitor the stored schedule to manipulate the DRM policy of the document stored in the database 30 in later, in accordance with the software module of the interpretation process or a separate software module installed in the RMS server 30.

Referring back to the interpretation process of FIG. 3, from the metadata interpreted at step S20, DRM policies for the document are generated at step S30. Each policy may include, for example, certain digital rights to access and use a document, e.g., view, copy or print the document. In the DRM database 36, each policy is associated with a document and users, and the users and the document may also be cross-associated. For example, in the DRM database, a document GUID may be associated with a policy ID and a user ID allowing the user to view the document, or a user ID may be associated with a document GUID and another policy ID allowing the user to view and print the document, or still another policy ID may be associated with a document GUID and a user ID allowing the user to view and copy the document.

In addition, at step S30 it may be necessary to obtain additional copyrights information or metadata from the ROC server 60. For example, once a course booklet is compiled from several individual articles, copyrights information (e.g., permission, royalty, etc.) may be needed for the compilation even though copyrights information for each of the individual articles has been obtained. If this is the case, then at step S32 additional copyrights information or metadata may be provided by or retrieved from the ROC server 60. This will ensure that the compiled booklet is also copyrights protected.

As a result of the above steps, DRM-protection to the digital document is enabled, which means that the digital document stored in file depository 34 of the RMS server 30 are now associated with respective DRM policy IDs and user IDs, which are stored, for example, in the DRM database 36 of the RMS server 30. In a sense this also means that a DRM-protected document has been generated from the originally unprotected digital document. The DRM-protected document is ready for purchase by users at step S40. When a user purchases or otherwise obtains rights to the DRM-protected document, it may be downloaded to the user's computer and stored in a memory or storage device of the user computer 20 at step S42.

When the user subsequently needs to access the DRM-protected document, the user typically tries to open the DRM-protected document by using a reader application software program installed on and executed by the user's computer 20. For example, if the DRM-protected document is in PDF, then the reader application may be the Adobe® Reader program. The reader application will initiate communication with a DRM application software program installed on and executed at the RMS server. For example, for documents in PDF, the DRM application may be the Adobe® LifeCycle® program. As mentioned earlier, the description and/or reference herein of the structures, functions, interfaces and other relevant features, such as DRM policies and API, of existing DRM applications such as Adobe® LifeCycle® are from readily available and accessible public information, documents and materials, e.g., "Rights Management" (URL http://help.adobe.com/en_US/livecycle/10.0/Overview/WS92d06802c76abadb2c8525912ddcb9aad9-7ff8.html), "Programmatically applying policies" (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc.

Referring back to FIG. 3 (and in conjunction with FIG. 1), at step S50 the user computer 20 sends an access request to RMS server 30 for approval (as indicated by the dotted arrow C1 in FIG. 1). The request transmitted from the user computer 20 to RMS server 30 will provide the document GUID and the user ID. When the RMS server 30 receives the request at step S52, it will search its DRM database 36 at step S54 to check whether the user has the necessary rights to the DRM-protected document. The search may look up the document GUID in the database and find its associated policy ID and user ID, or may look up the user ID to find its associated document GUID and policy ID. From the result of the search a determination of the user's rights to the DRM-protected document can be made at step S56. For example, if no user ID is found to be associated with the document GUID, then it can be determined that the user does not have any right to access and use the DRM-protected document. If the user ID is found to be associated with the document GUID, and a policy containing the rights to view and print the document is also found to be associated with the document GUID, then it can be determined that the user has rights to view and print the DRM-protected document.

As step S60 the RMS server 30 transmits the result of this determination to the user computer 20 (as indicated by the dotted arrow C2 in FIG. 1). At step S62 the user can access the DRM-protected document if the user's request is granted. For example, if the user is determined to have rights to view and print the DRM-protected document, then the reader program on the user computer 20 will open the DRM-protected document for the user to view, and will also allow the user to print the DRM-protected document when the user desires. On the other hand, if the user's request is denied, then the reader program on the user computer 20 will not open the DRM-protected document, but rather may inform the user that the request is denied and may further inform the user what steps may be taken to purchase or otherwise obtain rights to the DRM-protected document.

As mentioned above, during the process of enabling DRM protection to the digital documents, additional information may be generated. For example, when a course booklet is compiled, additional data items or information may be created as a result of the compilation process. Examples of such additional data items or information may include: course booklet cover information (e.g., title, compiler, year/semester in use, etc.), course booklet compiler information (e.g., login/registration username, password, contact information, etc.), LMS information (e.g., course name, serial/sequential number, institution/department), distribution information (e.g., print, e-distribution, delivery rights/channel based on institution, etc.), granted rights information (e.g., data of the users who have purchased rights to the booklet, such as login/registration username, password, contact information, etc.). Such data/information may be needed by the rights owners for their records and operation. So at step S70 the RMS server 30 transmits the newly generated data/information to the ROC server 60, and at step S72 the ROC server may use the data/information to update its metadata database 62.

The dotted boxes in FIG. 3 indicate typically what steps are performed by or at which system. For example, the dotted box on the middle indicates that steps S10, S20, S30, S40, S52, S54, S56, S60 and S70 are typically performed by the RMS server 30, the dotted box on the upper left indicates that step S12 is typically performed by the LMS server 50, the dotted box on the lower left indicates that steps S42, S50 and S62 are typically performed by the user computer 20, and the dotted box on the right indicates that Steps S14, S32 and S72 are typically performed by the ROC server 60. However, it is understood that alternative arrangement may be utilized to perform these steps.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method implemented in a digital rights management server (RMS server) for automating the management and interpretation of digital documents and their rights metadata to generate user access of a document protected by digital rights management (DRM), the RMS server being connected to a first and a second external server which are different servers, the method comprising the steps of:
   the RMS server obtaining a digital document from the first external server and obtaining its associated rights metadata from the second external server;
   the RMS server interpreting the metadata to ascertain DRM useful information including identifications (IDs) of the document and its users and associated digital rights;
   the RMS server generating entries for a DRM database including policies associated with the document ID and users IDs based on the ascertained DRM useful information to enable DRM protection to the document, the policies being different from the metadata in format, the generating step including converting information obtained from the metadata into data items satisfying a format of the DRM database; and
   the RMS server storing the policies in the DRM database separate from the digital documents.

2. The method of claim 1, wherein the step of obtaining the digital document and its associated rights metadata further comprises a step of accessing a content provider's document depository to obtain the digital document.

3. The method of claim 1, wherein the step of obtaining the digital document and its associated rights metadata further comprises a step of accessing a rights owners center's metadata database to obtain rights metadata.

4. The method of claim 3, further comprising the step of the RMS server obtaining additional rights information from rights owners center's metadata database for a newly compiled document.

5. The method of claim 3, further comprising the step of the RMS server sending information of the newly compiled document to the rights owners center for updating its metadata database.

6. The method of claim 1, wherein the step of interpreting the metadata further comprises a step of ascertaining rights granted to a document from copyrights information contained in the metadata associate with the document.

7. The method of claim 1, further comprising a steps of upon receiving a request from a user for accessing a DRM-protected document, the RMS server searching the DRM database for the document's ID or the user's ID to find out what policy is associated with the document ID and/or user ID.

8. The method of claim 7, further comprising a step of based on the search result, the RMS server determining whether to grant or deny the user request.

9. The method of claim 8, further comprising the step of the RMS server sending a decision on whether to grant or deny the user request to the user.

10. A computer program product comprising a non-transitory computer usable medium having a computer readable code embodied therein for controlling a digital rights management server (RMS server), the RMS server being connected to a first and a second external server which are different servers, the computer readable program code configured to cause the RMS server to execute a process for automating the management and interpretation of digital documents and their rights metadata to generate user access of a document protected by digital rights management (DRM), the process comprising the steps of:

obtaining a digital document from the first external server and obtaining and obtaining its associated rights metadata from the second external server;

interpreting the metadata to ascertain DRM useful information including identifications (IDs) of the document and its users and associated digital rights;

generating entries for a DRM database including policies associated with the document ID and users IDs based on the ascertained DRM useful information to enable DRM protection to the document, the policies being different from the metadata in format, the generating step including converting information obtained from the metadata into data items satisfying a format of the DRM database, and     storing the policies in the DRM database separate from the digital documents.

11. The computer program product of claim 10, wherein the step of obtaining the digital document and its associated rights metadata further comprises a step of accessing a content provider's document depository to obtain the digital document.

12. The computer program product of claim 10, wherein the step of obtaining the digital document and its associated rights metadata further comprises a step of accessing a rights owners center's metadata database to obtain rights metadata.

13. The computer program product of claim 12, further comprising the step of obtaining additional rights information from the rights owners center's metadata database for a newly compiled document.

14. The computer program product of claim 12, further comprising the step of sending information of the newly compiled document to the rights owners center for updating its metadata database.

15. The computer program product of claim 10, wherein the step of interpreting the metadata further comprises a step of ascertaining rights granted to a document from copyrights information contained in the metadata associate with the document.

16. The computer program product of claim 10, further comprising a steps of upon receiving a request from a user for accessing a DRM-protected document, searching the DRM database for the document's ID or the user's ID to find out what policy is associated with the document ID and/or user ID.

17. The computer program product of claim 16, further comprising a step of based on the search result, determining whether to grant or deny the user request.

18. The computer program product of claim 17, further comprising the step of sending a decision on whether to grant or deny the user request to the user.

\* \* \* \* \*